(No Model.) 3 Sheets—Sheet 1.
J. A. DAVIS.
ROTARY SICKLE FOR MOWING AND REAPING MACHINES.
No. 604,189. Patented May 17, 1898.
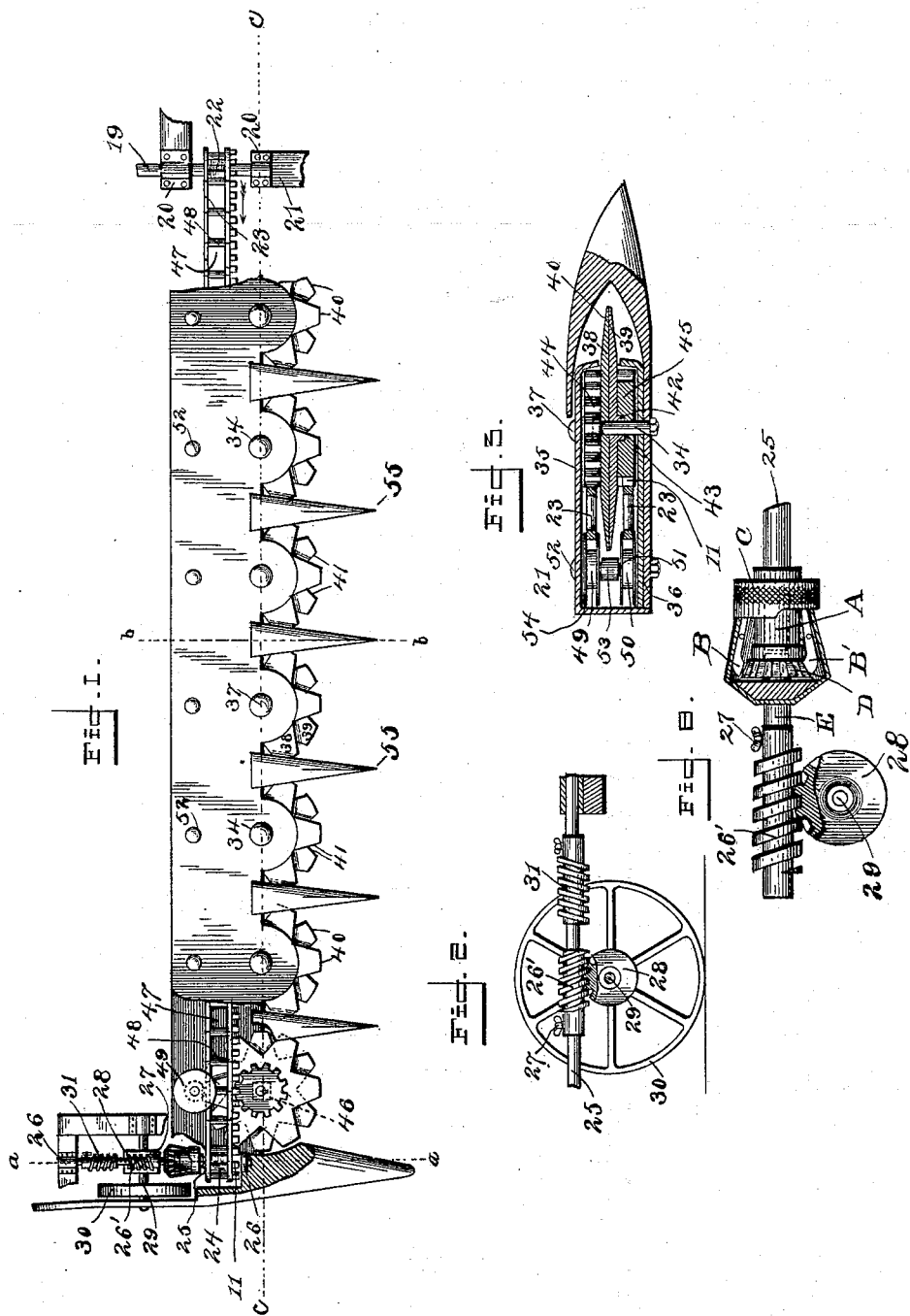
Witnesses
Fenton S. Belt
C. J. Bull
Inventor:
John A. Davis,
by H. B. Willson,
Attorney.

(No Model.) 3 Sheets—Sheet 2.
J. A. DAVIS.
ROTARY SICKLE FOR MOWING AND REAPING MACHINES.
No. 604,189. Patented May 17, 1898.
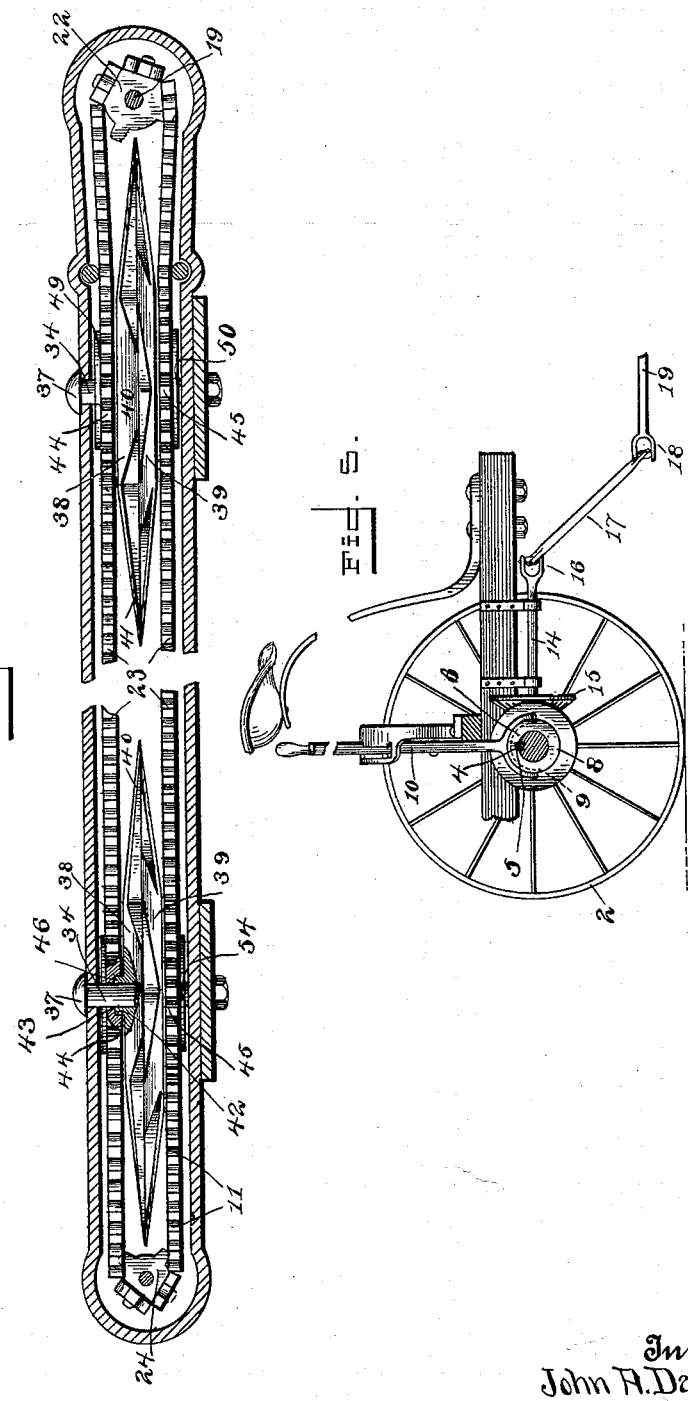
Witnesses
Fenton S. Belt.
C. B. Bull.
Inventor:
John A. Davis,
by H. B. Willson,
Attorney.

(No Model.)  3 Sheets—Sheet 3.
J. A. DAVIS.
ROTARY SICKLE FOR MOWING AND REAPING MACHINES.
No. 604,189. Patented May 17, 1898.
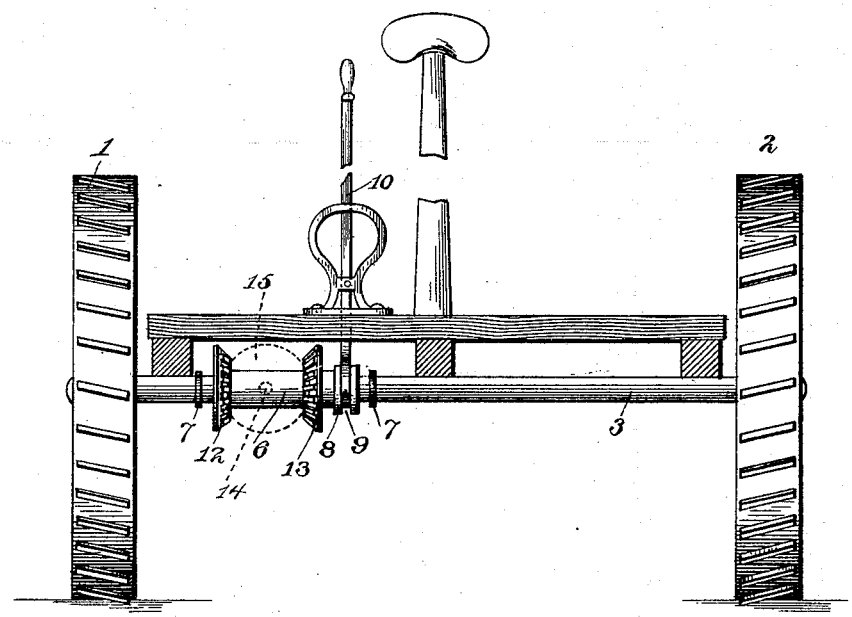
Fig. 6.
Fig. 7.
Witnesses
Fenton S. Belt.
C. J. Bull.
Inventor:
John A. Davis,
by H. B. Willson,
Attorney.

United States Patent Office.

JOHN A. DAVIS, OF DESERT LAKE, UTAH, ASSIGNOR OF TWO-THIRDS TO GEORGE IPSON, OF HUNTINGTON, AND HARRY WADE AND EUGENE MILLER, OF CASTLE GATE, UTAH.

ROTARY SICKLE FOR MOWING AND REAPING MACHINES.

SPECIFICATION forming part of Letters Patent No. 604,189, dated May 17, 1898.

Application filed April 29, 1897. Serial No. 634,426. (No model.)

*To all whom it may concern:*

Be it known that I, JOHN A. DAVIS, a citizen of the United States, residing at Desert Lake, in the county of Emery and State of Utah, have invented certain new and useful Improvements in Rotary Sickles for Mowing and Reaping Machines; and I do declare the following to be a full, clear, and exact description of the invention, such as will enable others skilled in the art to which it appertains to make and use the same.

My invention has relation to rotary sickles for mowing and reaping machines; and the object is to provide a simple and effective device for this purpose.

To this end the novelty consists in the construction, combination, and arrangement of the same, as will be hereinafter more fully described, and particularly pointed out in the claims.

In the accompanying drawings the same reference characters indicate the same parts of the invention.

Figure 1 is a top plan view, partly in section, of my improved sickle-bar. Fig. 2 is a transverse section on the line *a a* of Fig. 1. Fig. 3 is a similar view on the line *b b* of Fig. 1. Fig. 4 is a longitudinal section through the line *c c* of Fig. 1. Fig. 5 is a side elevation of the adjustable counter-shaft. Fig. 6 is a longitudinal section of the main driving shaft or axle, and Fig. 7 is a detail of the independent right and left hand threaded worm-screw sleeves that give the forward motion to the carrying-wheel. Fig. 8 is an enlarged detail view of the clutch mechanism for operating the carrying-wheel.

1 and 2 represent the ground-wheels, fixed on the horizontal axle 3. This axle is provided with a longitudinal key 4, which engages a keyway 5 in the sleeve 6, encompassing said axle and having a limited end play between the collars 7 7 on said axle.

8 represents a collar fixed on the sleeve 6 and formed with a rectangular circumferential groove 9, which engages the forked end of a hand-lever 10, by means of which the sleeve is reciprocated and locked at either end of its stroke.

12 13 represent parallel bevel gear-wheels fixed on the outer ends of said sleeve and rotating with it.

14 represents a horizontal shaft journaled in bearing-boxes suitably fixed in the frame, and its rear end carries a fixed bevel gear-wheel 15, arranged to alternately mesh with the bevel-gears 12 and 13.

16 represents a gimbal-joint connecting the outer end of the shaft 14 with the inner end of the adjustable counter-shaft 17, the forward end of which is connected by a gimbal-joint 18 with the rear end of the fixed shaft 19, journaled in bearing-boxes 20 20, secured to the inner end of the sickle-bar frame 21. This shaft 19 is provided with a fixed sprocket-wheel 22, which engages the inner loop of the endless sprocket-chain 23, the outer end of which encompasses a sprocket-wheel 24, fixed on the transverse counter-shaft 25, journaled in bearings 26 26, secured to the outer end of the sickle-frame. The counter-shaft 25 is provided with a sleeve A, which carries two parallel pivoted pawls B B' and a mutilated collar C, which may be rotated on the counter-shaft 25 to engage or release either of the pawls B or B' to throw one or the other of them in or out of engagement with the beveled ratchet-gear D, fixed on the alined shaft E, and said shaft 25 is provided with a detachable right-hand worm-sleeve 26', secured thereto by the thumb-screw 27 and which meshes with the worm-wheel 28 on the longitudinal counter-shaft 29, journaled in the sickle-bar frame and provided on its outer end with the carrying-wheel 30, to which motion is imparted in the direction in which the machine is traveling. This construction serves to allow the machine to back as well as make turns to the right and left hand without derangement.

34 34 represent a series of vertical spindles extending through the upper and lower plates 35 36, which form the sickle-bar frame 21, and they are removably secured thereto by the hemispherical nuts 37.

38 39 represent the upper and lower cutting-disks, formed with radial fingers 40, having diagonal knife-edges 41 41. These disks are formed with square hubs 42, having central circular orifices 43, which form a bearing for said disks on the spindles 34, and 44 45 represent plain spur gear-wheels having central square orifices 46 to receive the square hub 42 on the cutter-disks.

The sprocket-chain 23 consists of a series of open rectangular links 47, the contiguous parallel arms of which are hinged together by the sleeves 48 to form an endless chain, and the forward end of each link is provided with a series of integral gear-teeth 11, corresponding to and meshing with the teeth on the gear-wheels 44 45, and when bevel gear-wheel 15 is in mesh with the gear 12 on the axle the upper parallel line of the sprocket-chain travels outward to the end of the sprocket-bar frame and the lower parallel line of the chain travels inwardly toward the shaft 19. This motion of the sprocket-chain causes the gear-teeth on the chain to rapidly rotate the upper series of cutter-disks to the left and the lower series to the right, as shown by the arrows in Fig. 1.

When the bevel gear-wheel 15 is released from the gear-wheel 12 and thrown into gear with the opposite wheel 13, the motion of the shaft 19 is reversed. Consequently the sprocket-chain travels in the direction opposite to its former motion, reversing the direction of the cutting-disks, and at the same time the right-hand worm-sleeve 26' is removed and replaced by the left-hand worm-sleeve 31 to rotate the carrying-wheel 33 in the same direction in which the machine is traveling, at the same time the position of the mutilated collar C is reversed, so as to throw the pawl B out of engagement with the ratchet-gear D and release the pawl B', so that it will engage said gear.

49 50 represent a series of horizontal guide-wheels mounted on vertical spindles 51, secured in the sickle-bar frame by nuts 52 52 and separated by a bearing-washer 53. These guide-wheels are provided with radial parallel flanges 54 54, which form rotating bearings for the rear edge of the sprocket-chain, and as one set of these guide-wheels is arranged immediately in the rear of and in the same plane with the set of cutting-disks they also serve as bearing-guards to keep the teeth on the opposite edge of the chain in mesh with the spur-gears 44 45.

The usual guard-fingers 55 extend forward from the sickle-bar frame, and they are located intermediate each contiguous set of cutting-disks to divide the stalks and deflect them on either side to the action of the cutting-blades.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim, and desire to secure by Letters Patent, is—

1. A mowing and reaping machine comprising the main axle provided with a longitudinal key 4, and collars 7 7, the sleeve 6 formed with the keyway 5, and provided with the oppositely-disposed fixed bevel-gears 12 13, the shaft 14, the bevel gear-wheel 15, mounted on said shaft and adapted to alternately engage the gear-wheels 12 13, the shaft 19 in operative connection with said shaft 14, and provided with the sprocket-wheel 22, the parallel shaft 25 the sprocket-wheel 24 mounted thereon, and the endless sprocket-chain 23 encompassing said sprocket-wheels, and provided with a series of gear-teeth in combination with the cutting-disks 38 39 arranged one above the other and provided with rectangular hubs 42 and the spur gear-wheels 44 45 having rectangular orifices 46 to receive the hubs of said disks, substantially as shown and described.

2. A mowing and reaping machine comprising a sickle-bar frame provided with a carrying-wheel on its outer end and means substantially as described for imparting a continuous rotary motion to said wheel independent of its contact with the ground, as and for the purpose set forth.

In testimony whereof I hereunto affix my signature in presence of two witnesses.

JOHN A. DAVIS.

Witnesses:
  JOE A. YOUNG,
  A. P. JOHNSON.